United States Patent Office 2,884,454
Patented Apr. 28, 1959

2,884,454

PROCESS FOR THE PRODUCTION OF MONO-ALKYL SUBSTITUTED ACID CHLORIDES OF MALONIC ACID

Eduard Enk and Hellmuth Spes, Burghausen, Germany, assignors to Wacker-Chemie G.m.b.H., Munich, Germany, a firm of Germany No Drawing. Application January 27, 1958
Serial No. 711,137

Claims priority, application Germany February 6, 1957

11 Claims. (Cl. 260—544)

In the production of a mono-alkyl substituted malonic acid chloride, one ordinarily employs the corresponding mono-alkyl substituted malonic acid as the starting material and the latter is then converted into the desired acid chloride by the action of phosphorus pentachloride or of thionyl chloride, for example, on the alkyl substituted acid. The free acid itself is obtained by the saponification of the corresponding malonic acid ester which may be obtained in several ways.

Many difficulties are encountered, however, in introducing an alkyl group into the malonic acid or malonic acid ester structure. For example, a sodium malonic acid ester may be reacted with an alkyl halide but a major byproduct and one of the most troublesome is the dialkyl-substituted malonic acid ester which also forms. Alternatively, in another synthetic pathway, carboxylic acids substituted in alpha-position by a bromine group may be reacted with an alkali metal cyanide and the cyano group on the cyano-substituted compound which is formed may then be hydrolyzed and the acid obtained by this hydrolysis then esterified. The yield obtained by this procedure is low and accordingly this process is quite unsatisfactory. One can also condense a malonic acid ester with an aldehyde and the alkylidene compound obtained can then be hydrogenated under a pressure of 100 to 130 atmospheres. It is also possible to condense an oxalic acid ester with a carboxylic acid ester and then to split off carbon dioxide. Furthermore, one can condense phosgene or diphosgene with acyl chlorides at elevated temperatures but the yield obtained by this process is quite low and amounts to at most 20%. In conclusion, then, it is clear that the production of monoalkyl substituted malonic acid esters which can be converted to the corresponding acid chlorides is quite difficult and that up to the present no really commercially feasible process for the production of mono-alkyl substituted malonic acid chlorides is available.

It is, therefore, an important object of this invention to provide an improved process for the production of mono-alkyl substituted malonic acid chlorides.

Another object of this invention is the provision of a process for the production of mono-alkyl substituted malonic acid chlorides which may be carried out in continuous fashion from readily available materials and in which excellent yields may be obtained. Other objects of this invention will appear from the following detailed description.

It has now been found that mono-alkyl substituted malonic acid chlorides may be obtained in a continuous fashion by reacting an alkyl-substituted ketene with phosgene in an inert solvent medium so that the reaction proceeds in accordance with the following:

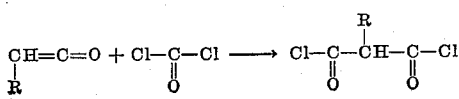

wherein R is a lower alkyl group such as a methyl, ethyl, propyl, isopropyl, butyl or isobutyl group.

The reaction may be carried out over a wide temperature range and temperatures of from −80° to +80° C. have been found to be satisfactory. A catalyst may be employed to aid the reaction and catalysts such as zinc chloride and concentrated sulfuric acid, for example, have been found to be suitable. Other catalysts which are satisfactory are ferric chloride, mercuric chloride, p-toluene sulfonic acid and boron fluoride etherate.

The reaction may be carried out at ordinary or atmospheric pressure, or pressures of from 30 to 760 mm. of mercury may be employed. Preferably, the reaction is carried out at subatmospheric pressure with pressures of from 80 mm. up to ordinary atmospheric pressure being most suitable.

The preferred reaction temperature which is employed is from −20 to 0° C. As the inert solvent medium, methyl propionate, for example, may be employed but other inert solvent media are also suitable. Even more convenient is a reaction medium consisting of the particular mono-alkyl substituted malonic acid chloride which is being formed.

A simple convenient method of carrying out the process of this invention is to pass a vapor phase mixture of the alkyl-substituted ketene and a slight stoichiometric excess of phosgene into an inert, liquid reaction medium which is maintained at the desired reaction temperature. Where a relatively low temperature is employed it may be attained by the use of suitable cooling means. The reaction medium employed will include the catalyst, when employed, and may conveniently contain from about 0.1 to 5% by weight of the catalyst employed. For the purpose of carrying out this novel process a spray tower or scrubber may be employed and in which the inert solvent medium is introduced at the top of the tower or scrubber while the vapor mixture of alkyl-ketene and phosgene passes upward through the liquid spray or in contact with the liquid as it passes over suitable packing. The inert solvent medium is advantageously recycled for maximum efficiency. A part of the solvent medium in which the mono-alkyl substituted malonic acid chloride formed is dissolved may be withdrawn as a side stream from the main body of the recycled or circulating solvent medium and in this way the reaction product is readily recovered.

The unreacted phosgene may be recovered by cooling the vapor stream passing to the vacuum pump. It is also possible to introduce the alkyl-ketene into a solvent medium containing dissolved phosgene and suitable contact may be obtained by introducing the vapors of the alkyl-ketene into the solvent medium through a sparger which produces small bubbles.

The process of this invention is especially advantageous in that the mono-alkyl substituted malonic acid chloride formed may usually be employed without further purification or isolation for any desired chemical reaction without first being separated from the inert solvent medium in which it is formed.

Example 1

A vapor mixture consisting of 1429 grams of methyl-ketene and 3020 grams of phosgene is introduced, over the course of several hours into a solvent medium consisting of 3200 grams of methyl propionate which is being continuously circulated through a spray tower, the pressure in the tower being maintained at 120 mm. of mercury. The methyl propionate is circulated at a rate of between 100 and 200 liters per hours while being held at a temperature of between 0 and −5° C. by suitable cooling means. The unreacted phosgene is recovered by the cooling and condensation of the exhaust vapors upstream of the vacuum pump. The reaction medium obtained at the end of this period contains 997 grams of phosgene, 2070 grams of methyl-malonic acid chloride and 293 grams of polymerized product, in 2950 grams of methyl propionate. The condensate obtained consists of 425 grams of phosgene and 250 grams of methyl propionate.

The yield of methyl-malonic acid chloride obtained is 71.8% based upon the methyl-ketene absorbed during the circulation of the inert solvent medium. Calculated on the phosgene reacted the yield is 43.9%, with 47.1% of the phosgene being recovered.

If 2% by weight of a catalyst is added to the recycling, inert liquid reaction medium but the reaction conditions otherwise remaining the same, the yields of methyl-malonic acid chloride obtained, calculated on the methyl ketene absorbed, are the following for each of the respective catalysts given:

| Catalysts— | Yield, percent |
| --- | --- |
| Mercuric chloride | 75.1 |
| Conc. sulfuri acid | 49.8 |
| P-toluene sulfonic acid | 61.8 |
| Zinc chloride | 52.8 |
| Ferric chloride | 44.7 |
| Boron fluoride etherate | 47.4 |

*Example 2*

In accordance with the procedure described in Example 1, 1588 grams of ethyl-ketene and 3370 grams of phosgene are reacted employing 3200 grams of methyl propionate as the circulating inert reaction medium, the latter being cooled to −5° C. and the spray tower in which the reaction is carried out being maintained under a pressure of 200 mm. of mercury. A total reaction product mixture amounting to 5539 grams is obtained which consists of 1369 grams of phosgene, 2313 grams of methyl propionate, 1390 grams of ethyl-malonic acid chloride and 467 grams of polymers, as well as 1955 grams of a condensate consisting of 1068 grams of phosgene and 887 grams of methyl propionate.

The yield of ethyl-malonic acid chloride obtained is 55.2% calculated on the ethyl-ketene absorbed, and 37.3% calculated upon the phosgene absorbed. Of the phosgene introduced 72.3% is recovered.

*Example 3*

Following the procedure described in Examples 1 and 2, 2003 grams of isopropyl ketene and 3080 grams of phosgene are reacted in 3217 grams of methyl propionate at a temperature of 0° C. and under a pressure of 325 mm. mercury. A reaction product amounting to about 7470 grams is obtained containing 1495 grams of phosgene, 1495 grams of isopropylmalonic acid chloride and 1000 grams of polymeric products, with 510 grams of phosgene being recovered as a condensate. The yield of isopropyl-malonic acid chloride amounts to 40.7% calculated upon the isopropyl-ketene absorbed, and to 35% calculated upon the phosgene absorbed. 65% of the phosgene introduced into the reaction is recovered.

The malonic acid chlorides obtained in the Examples given above may be readily converted to the corresponding esters by reacting the acid chlorides with an alcohol, such as ethyl alcohol, for example. Since the acid chlorides are highly reactive they may be readily hydrolyzed with water to form the corresponding malonic acids, they may be converted to amides with ammonia, or to substituted amides by reaction with urea or with other nitrogen bases.

What is claimed is:

1. Process for the production of mono-alkyl substituted malonic acid chlorides, which comprises reacting a mono-alkyl-substituted ketene with phosgene in an inert solvent medium employing a reaction temperature of from −80° to 80° C.

2. Process in accordance with claim 1 wherein the inert solvent medium is a mono-substituted malonic acid chloride.

3. Process in accordance with claim 1 wherein the reaction is carried out at a pressure below atmospheric pressure.

4. Process in accordance with claim 1 wherein from 0.1% to 5% by weight of a catalyst is added to the reaction medium.

5. Process in accordance with claim 1 wherein a stoichiometric excess of phosgene is employed.

6. Process in accordance with claim 1 wherein the alkyl substituent is a lower alkyl group containing from one to four carbon atoms.

7. Process for the production of mono-methyl malonic acid chloride, which comprises reacting methyl-ketene with an excess of phosgene at a subatmospheric pressure in an inert solvent medium at a temperature of −80° to 80° C.

8. Process in accordance with claim 7 wherein the inert solvent medium is methyl propionate and the reaction temperature is at most 0° C.

9. Process in accordance with claim 8 wherein a catalyst is added to the inert solvent sodium.

10. Process for the production of mono-ethyl malonic acid chloride, which comprises reacting ethyl-ketene with an excess of phosgene at a subatmospheric pressure in an inert solvent medium at a temperature of −80° to 80° C.

11. Process for the production of mono-isopropyl malonic acid chloride, which comprises reacting isopropyl ketene with an excess of phosgene at a subatmospheric pressure in an inert solvent medium at a temperature of −80° to 80° C.

References Cited in the file of this patent

Staudinger: Die Ketene, pp. 92–93 (1912).